United States Patent [19]

Durtnal

[11] Patent Number: 4,791,696
[45] Date of Patent: Dec. 20, 1988

[54] WINDSCREEN WIPER SYSTEM

[76] Inventor: Graham Durtnal, 106, Cowper Rd., Hanwell, London W7 1EJ, England

[21] Appl. No.: 148,815

[22] Filed: Jan. 27, 1988

[30] Foreign Application Priority Data

Jan. 28, 1987 [GB] United Kingdom ............... 8701809

[51] Int. Cl.$^4$ .............................................. B60S 1/22
[52] U.S. Cl. .................................................. 15/250.23
[58] Field of Search ........... 15/250.21, 250.23, 250.13, 15/250.35

[56] References Cited

U.S. PATENT DOCUMENTS

| | | | |
|---|---|---|---|
| 2,834,038 | 5/1958 | Kramer | 15/250.23 |
| 2,849,742 | 9/1958 | Gores | 15/250.23 |
| 3,404,423 | 10/1968 | Howard et al. | 15/250.23 |
| 4,512,056 | 4/1985 | Wattier | 15/250.23 |
| 4,525,891 | 7/1985 | Leroy et al. | 15/250.23 |

FOREIGN PATENT DOCUMENTS 1162324  4/1958  France ........................... 15/250.23

Primary Examiner—Peter Feldman
Attorney, Agent, or Firm—E. Herbert Liss

[57] ABSTRACT

A windscreen wiper system comprises a drive shaft (1), a windscreen wiper arm (2) mounted at one end (3) on the drive shaft (1) for reciprocal pivotal movement therewith and a windscreen wiper blade (9) articulated to the other end (4) of the arm (2). A link (6) extending substantially at right angles to the surface of the windscreen is pivotally connected to both the arm (2) and the blade (9) so as to provide an articulated connection therebetween and a control lever (12) is pivotally connected at one end to the link (6) between the pivots for the arm (2) and the blade (9). A cam surface (15) is associated with the drive shaft (1) and a cam follower (16) is provided for cooperation with the cam surface (15) and mounted on the other end (11) of the control lever (12). The arrangement is such that the cam follower (16) follows the cam surface (15) during pivotal movement of the arm (2) and varies the position of the control lever (12) with respect to the arm (2) to move the blade (9) generally longitudinally of the arm (2).

7 Claims, 3 Drawing Sheets

WINDSCREEN WIPER SYSTEM

This invention relates to a windscreen wiper system.

With modern windscreen wiper systems some automobile manufacturers have favoured the introduction of a single wiping arm and blade for certain of their automobiles rather than the twin arrangement which is common to the majority of mass produced automobiles. However, such single arm and blade arrangements, while possibly having a more elegant appearance, suffer from a number of disadvantages inherent in this concept. Thus while regulations specify, in many cases, the angle of view which must be wiped, it is difficult, if not impossible, to use a single blade and arm of conventional design and drive since either certain parts of the regulated area remain unwiped or else the area of wipe extends beyond the confines of the windscreen itself, either causing the surrounding body to be wiped or providing for the windscreen wiper blade to stick out from the body during part of its cycle in a way which could be dangerous.

A way round this problem has already been proposed in which the blade does not follow a circular arc but has its path modified to provide a wiped area which conforms more closely to the contours of the windscreen. A number of proposals have been made for producing this type of wipe ranging from the provision of tracks at top and bottom of the windscreen along which a windscreen wiper blade, possibly of conventional design, can move linearly to complex gear driven arms and blades. However these proposals have not been a general commercial success since they tend to be both unwieldy and expensive to produce.

The present invention seeks to provide a windscreen wiper system which can sweep an area closer to the edges of a windscreen than the usual arc but which is of relatively simple construction and thus relatively inexpensive to produce.

According to the invention, there is provided a windscreen wiper system comprising a drive shaft, a windscreen wiper arm mounted at one end on the drive shaft for reciprocal pivotal movement therewith and a windscreen wiper blade articulated to the other end of the arm, wherein a link extending substantially at right angles to the surface of the windscreen is pivotally connected to both the arm and the blade so as to provide an articulated connection therebetween, a control lever is pivotally connected at one end to the link between the pivots for the arm and the blade, a cam surface is associated with the drive shaft and a cam follower is provided, for cooperation with the cam surface, mounted on the other end of the control lever, the arrangement being such that the cam follower follows the cam surface during pivotal movement of the arm and varies the position of the control lever with respect to the arm to move the blade generally longitudinally of the arm.

The invention will now be described in greater detail, by way of example with reference to the drawings in which.

Figure 1:
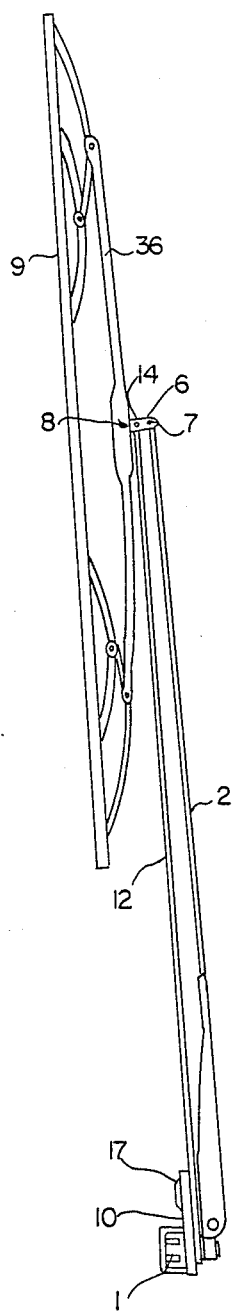
FIG. 1 is a side view of one form of windscreen wiper system in accordance with the invention.

Referring to the drawings, a windscreen wiper system comprises a reciprocating or oscillating drive shaft 1 driven suitably by an electric motor through linkage (not shown) in the usual way. This shaft 1, carries a windscreen wiper arm 2, also basically of usual construction, being attached at one end 3 to the shaft 1 for movement therewith. The other end is formed with a portion 4 cooperating with the end 5 of a link 6 to provide a pivotal connection 7 therewith. The other end of the link 6 is pivotally connected by a pivot pin 8 to a windscreen wiper blade 9 which is generally of normal construction.

Associated with the shaft 1 is a cam element 10 (FIGS. 2 and 3) which cooperates with one end 11 of a control lever 12, the other end of which is pivotally connected at 14 to the link 6 between the pivotal connection 7 to the arm and the pivotal connection 8 to the blade 9.

Figure 2:
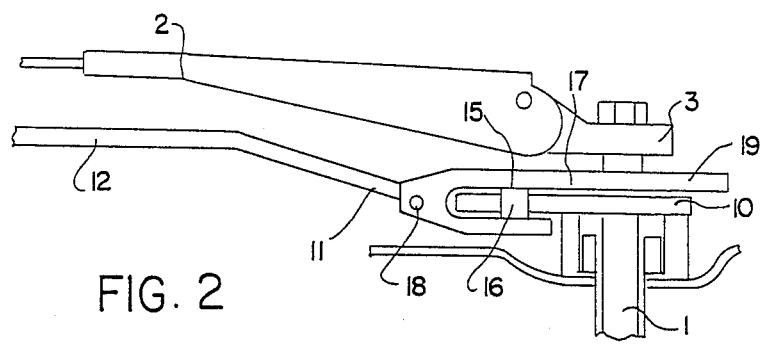
FIG. 2 is a side view on an enlarged scale of the drive end of the system of FIG. 1.
Figure 3:
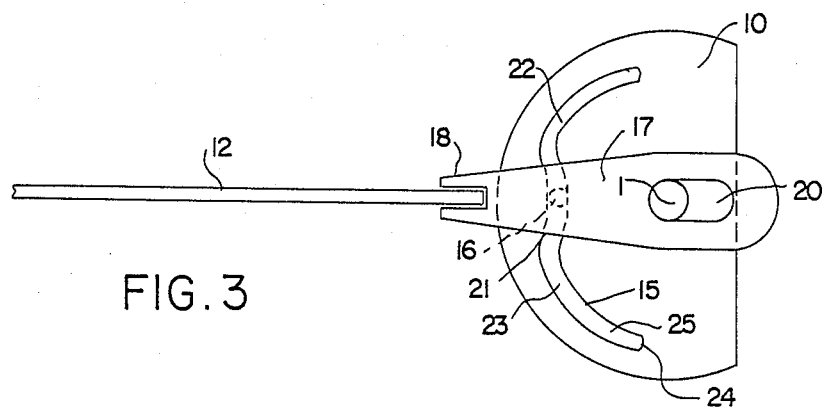
FIG. 3 is a plan view on an enlarged scale of the drive end of the system of FIG. 1 but with the windscreen wiper arm removed.

The drive and cam arrangement are shown in detail in FIGS. 2 and 3. As can be seen, this comprises a cam 10 with a cam slot 15 in which a follower roller 16 is located, the roller 16 being mounted rotatably between the arms of a bifurcated termination 17 pivoted to the control lever 12 at 18. One arm 19 of the bifurcated termination 17 is longer than the other arm and is provided with a slot 20 through which the shaft 1 projects so that the control lever 12 is additionally guided thereby.

The cam slot 15 is arranged about the axis of the shaft 1 but is stationary relative thereto. It has a central portion 21 of reduced radius which extends into portions 22 and 23 of greater radius towards its ends. One end 24 also has a portion 25 of reduced radius. As will be explained hereafter, this means that the wiper blade will be nearer the pivot axis in the central portion 21 and the end portion 25 but further away at its portions 22 and 23.

Figure 4:
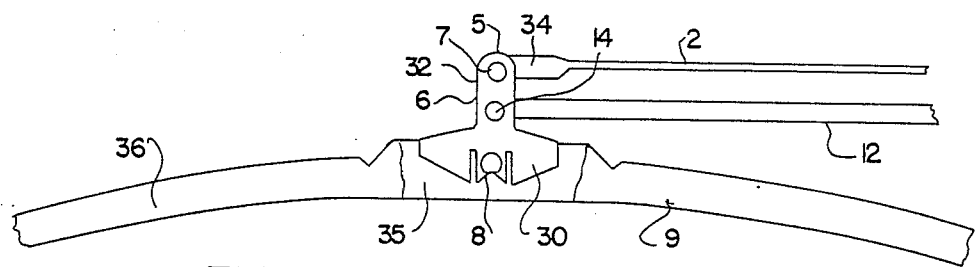
FIG. 4 is a side view, on an enlarged scale, of the connection between the arm, blade and control lever of FIG. 1.

The connection between the arm blade and control lever is shown in detail in FIG. 4. As can be seen, the link 6 comprises a connector portion 30 which is adapted to be sprung onto and pivot on the pivot pin 8 usually provided in an aperture 35 of the main yoke 36 of the blade 9. Above this connector portion 30 (in the sense of being further away from the windscreen) is an upstanding portion 32 with the two pivotal connections 7 and 14. It will also be seen that the end of the wiper arm 2 has a twist 34 in it to enable the pivotal connection 7 to be made. With the arrangement shown, the pivotal connections 7 and 14 may be of riveted form. In this way the wiper arm 2, the control lever 12 and the blade 9 are pivotally connected together by way of the link 6.

Figure 5:
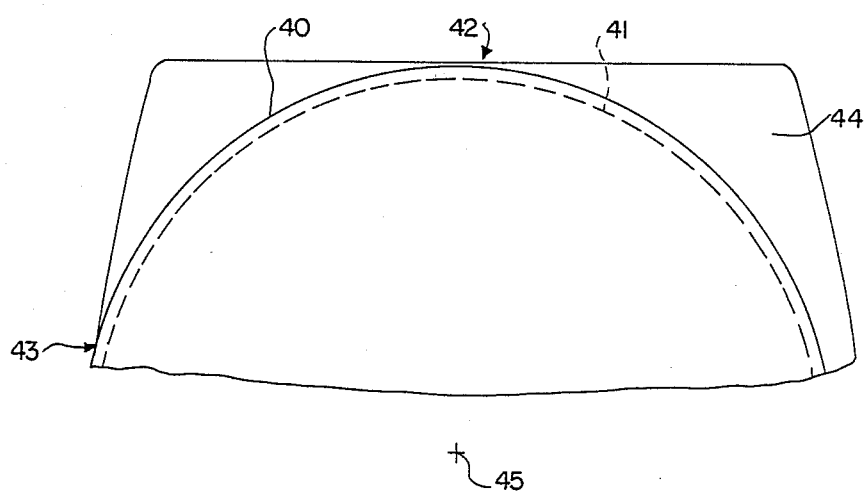
FIG. 5 is a diagram of the the wiping pattern of the system as shown in FIG. 1 as compared to a normal arc pattern.

FIG. 5 shows the intended wiping pattern of the windscreen wiper blade. The pattern drawn in full lines and indicated at 40 represents the pattern as achieved by the wiper system of FIG. 1 while the broken line indicated at 41 represents the usual arc wipe pattern. As can be seen, the two patterns merge in the central portion 42 and at one end 43 of the patterns while at the remaining parts of the pattern, the pattern of the present invention extends much closer to the edge of the screen than does the usual arc pattern. 44 represents the windscreen and 45 represents the axis of the shaft 1.

The operation of the system will now be described:

Starting at the mid position as indicated in FIG. 3, the blade 9 will be at its closest to the axis of the shaft 1 and therefore the shaft 1 will be at the left hand end of the slot 20 (FIG. 3). As the wiper moves clockwise, the roller 16 will enter the portion 22 of the cam slot 15 and cause the control lever 12 to move outwards relative to the axis of the shaft 1, the shaft 1 then being located at the right hand end of the slot 20.

The control lever 12 will thus move outwards relative to the wiper arm 2 causing the link 6 to pivot clockwise about the connection 7, thus moving the blade 9 outwards to its maximum radius. When the wiper reaches the end of its clockwise stroke, the direction of rotation of the shaft 1 is reversed and the wiper will return to its central position, the blade 9 being pulled back to its minimum radius by the control arm 12. Continued anticlockwise motion will bring the roller 16 into the portion 23 and will cause the blade to be again pushed out to its maximum radius. However, as the roller 16 moves out of the portion 23 into the portion 25, the radius of the blade is once again reduced. The return or clockwise sweep of the wiper back to the centre will again push the blade out and then return it to its minimum radius. The path of the end of the blade can clearly be seen from FIG. 5, from which it can be seen that the wiping path of the blade is closer to the edges of the screen than is the normal arc.

It will be understood that the exact path followed by the wiper blade will need to depend on the shape of the windscreen to which it is applied. Any necessary variation in the pattern can be achieved by varying the path of the cam. Thus, for example, both the upper and lower portions of the cam slot may be mirror images where no variation in the wiping pattern between the opposite sides of the windscreen is needed.

It will be appreciated that various modifications may be made to the above described embodiment without departing from the scope of the invention. For example, the cam slot could be replaced by a cam surface, the control lever being spring biassed in a direction to hold the roller gainst the cam surface. Where desired, the same system could be used with two or more windscreen wipers, in which case, each wiper could have a differently shaped cam.

Instead of the cam surfce and follower being located between the drive shaft and the blade, it could equally well be located on the side of the drive shaft away from the blade, it being borne in mind that the shape of the cam would remain the same and have the same orientation.

The form of the pivotal connection between the link and the blade could be varied, using any suitable known connection.

It will be seen that the above described embodiment provides a wiper system which enables the blade path to approach closer to the edges of a windscreen than the normal arcuate path and which is of relatively simple construction.

I claim:

1. A windscreen wiper system comprising a drive shaft, a windscreen wiper arm mounted at one end on the drive shaft for reciprocal pivotal movement therewith and a windscreen wiper blade articulated to the other end of the arm, wherein a link extending substantially at right angles to the surface of the windscreen is pivotally connected to both the arm and the blade so as to provide an articulated connection therebetween, a control lever is pivotally connected at one end to the link between the pivots for the arm and the blade, a cam surface is associated with the drive shaft and a cam follower is provided, for cooperation with the cam surface, mounted on the other end of the control lever, the arrangement being such that the cam follower follows the cam surface during pivotal movement of the arm and varies the position of the control lever with respect to the arm to move the blade generally longitudinally of the arm.

2. A system as claimed in claim 1, wherein the said other end of the control lever is provided with a longitudinal slot through which the drive shaft passes so as to provide a pivot for the control lever while allowing radial movement control lever in relation to the drive shhaft.

3. A system as claimed in claim 1 wherein the cam surface is in the form of a slot in a stationary plate in which a roller, mounted on the said other end of the control lever, runs.

4. A system as claimed in claim 3, wherein the cam surface is located on the same side of the drive shaft as the windscreen wiper blade.

5. A system as claimed in claim 4, wherein the control lever is bifurcated at said other end, the plate carrying the cam slot extending into the bifurcation and the roller being mounted between the two arms thereof.

6. A system as claimed in claim 3, wherein the cam slot comprises a central portion which is radially closer to the drive shaft than the adjoining portions.

7. A system as claimed in claim 6, wherein the cam slot has at least one end portion which is radially closer to the drive shaft than the adjoining portions.

* * * * *